(12) United States Patent
Stolmeier et al.

(10) Patent No.: US 8,554,642 B2
(45) Date of Patent: Oct. 8, 2013

(54) RFID METHODS IN THE MANUFACTURE OF RECLOSABLE PACKAGES

(75) Inventors: Robert C. Stolmeier, Shelbyville, IN (US); Robert E. Hogan, Burr Ridge, IL (US)

(73) Assignee: Illinois Tool Works Inc., Glenview, IL (US)

( * ) Notice: Subject to any disclaimer, the term of this patent is extended or adjusted under 35 U.S.C. 154(b) by 2223 days.

(21) Appl. No.: 11/443,914

(22) Filed: May 31, 2006

(65) Prior Publication Data

US 2007/0294148 A1     Dec. 20, 2007

(51) Int. Cl.
*G06Q 10/00*     (2012.01)
*G08B 13/14*     (2006.01)

(52) U.S. Cl.
USPC .................. 705/28; 340/572.1; 340/572.7

(58) Field of Classification Search
None
See application file for complete search history.

(56) References Cited

U.S. PATENT DOCUMENTS

| 6,232,870 | B1 | 5/2001 | Garber |
| 6,265,977 | B1 | 7/2001 | Vega |
| 6,591,227 | B2 | 7/2003 | Koehler |
| 7,005,965 | B2 | 2/2006 | Chen |
| 2008/0252461 | A1* | 10/2008 | Sugata et al. .............. 340/572.7 |

FOREIGN PATENT DOCUMENTS

| WO | WO 2005/073905 | 8/2005 |
| WO | WO 2005073905 A1 * | 8/2005 |

* cited by examiner

*Primary Examiner* — Mussa A Shaawat
(74) *Attorney, Agent, or Firm* — McCarter & English, LLP

(57) ABSTRACT

The present disclosure relates to the implanting of RFID (radio frequency identification) chips into the slider of a zipper of a reclosable package. This allows for subsequent reading of the RFID identifying data to identify associated with the reclosable package. This can be done by using the RFID data directly or by using the RFID data to access a database This can be done for authentication, security, quality control, inventory control and similar purposes.

20 Claims, 1 Drawing Sheet

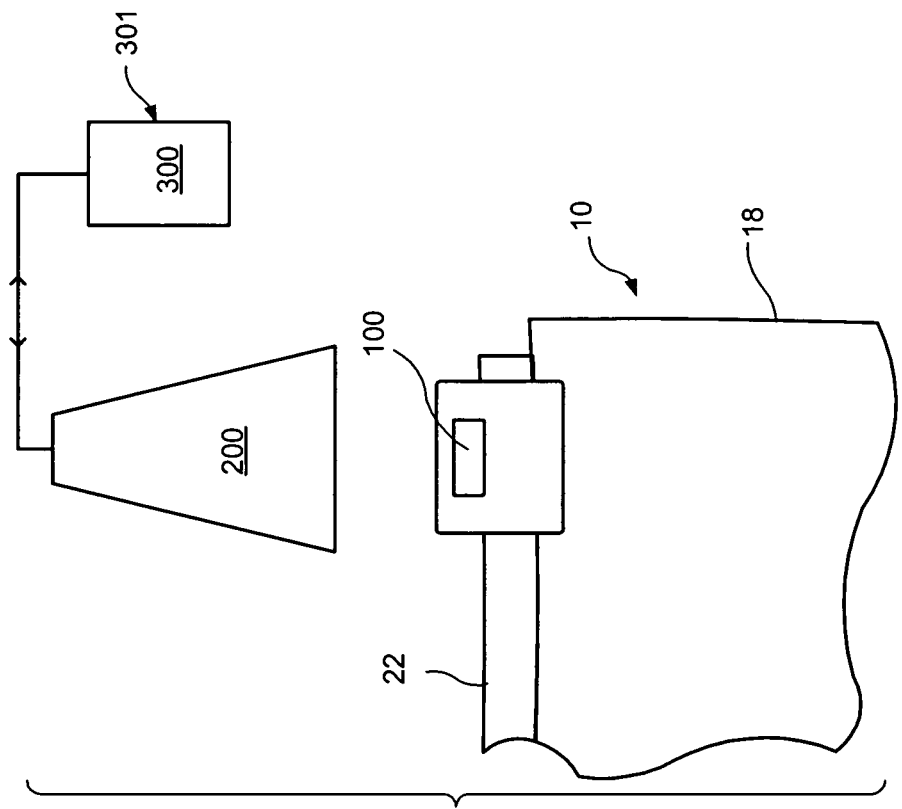
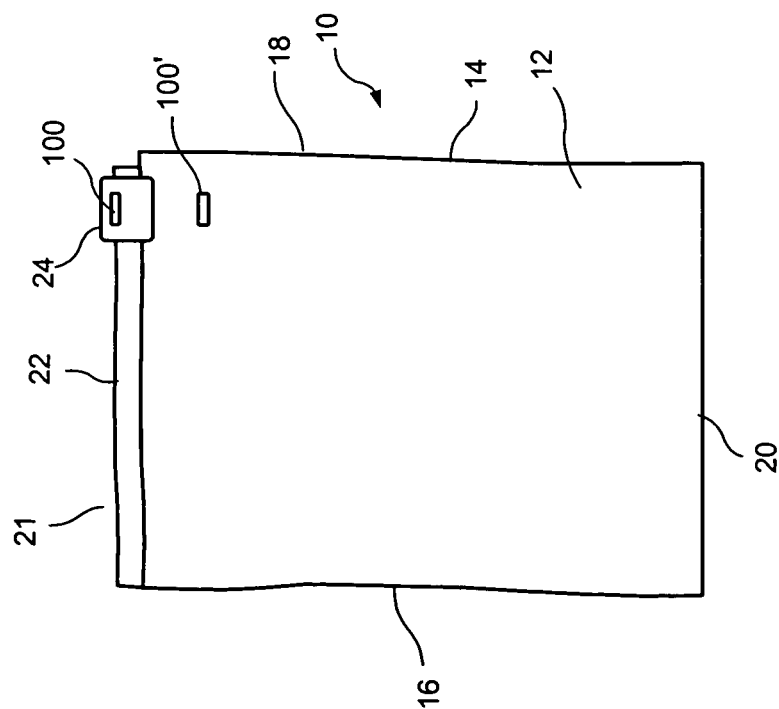
FIG. 2
FIG. 1

RFID METHODS IN THE MANUFACTURE OF RECLOSABLE PACKAGES

BACKGROUND OF THE INVENTION

1. Field of the Invention

The present invention relates to RFID (radio frequency identification) and similar methods in the manufacture of reclosable packages. In particular, the present invention relates to the implanting of RFID chips into the slider of a reclosable package for various purposes, including, but not limited to, security, authentication and inventory tracking.

2. Description of the Prior Art

The technology behind RFID tags is well-developed. Notably, this technology has resulted in further miniaturization of RFID tags, such as the Mu (μ)-chip by Hitachi.

When excited, RFID tags produce a magnetic or electric field which is modulated with an identifying code. In smaller RFID tags, passive technology is used to eliminate the need for a battery or other power supply source in the tag. Such a passive RFID tag requires external excitation in order for a reader to sense the RFID tag.

Various manufacturing or similar tracking applications using RFID technology are disclosed in U.S. Pat. No. 7,005,965, entitled "Radio Frequency Identification Device" issued on Feb. 26, 2006 to Chen; U.S. Pat. No. 6,591,227 entitled "Tooling Tracking System for Sheet Fed and Web Fed Presses Using Radio Frequency Identification" issued on Jul. 8, 2003 to Koehler; U.S. Pat. No. 6,265,977 entitled "Radio Frequency Tag Apparatus and Related Method", issued on Jul. 24, 2001 to Vega; and U.S. Pat. No. 6,232,870 entitled "Applications for Radio Frequency Identification Systems" issued On May 15, 2001 to Garber, the contents of all of which are hereby incorporated by reference.

However, further developments are sought in the use of RFID tags in the field of reclosable packages, particularly, but not limited to security, authentication and inventory tracking.

OBJECTS AND SUMMARY OF THE INVENTION

It is therefore an object of the present invention to use RFID to improve the manufacturing processes, security, authentication and inventory tracking associated with reclosable packages.

This and other objects are attained by providing a slider for a reclosable package, with an RFID chip embedded or molded or attached thereto. The identifying data can be downloaded into the RFID chip at the time the chip is being manufactured, at the time when the package is manufactured or when the packing is being or has been filled. The identifying data of the RFID chip can be used directly to include various data regarding the reclosable package and its contents. Alternatively, a database is compiled associating the RFID identifying data with the contents and other characteristics of the reclosable package, such as its contents. The RFID chip is subsequently read at a remote time and place in order either to use the data directly or to access the database and obtain data relating to the reclosable package.

BRIEF DESCRIPTION OF THE DRAWINGS

Further objects and advantages of the invention will become apparent from the following description and from the accompanying drawings, wherein:

FIG. 1 is a front plan view, partly in phantom, of a reclosable package, including a slider zipper wherein an RFID tag is inserted into the slider, pursuant to the present invention. Additionally, a location for the RFID tag in an alternative embodiment is illustrated.

FIG. 2 is a perspective view of a reader interrogating the RFID tag in the slider of the reclosable package of FIG. 1.

DETAILED DESCRIPTION OF THE PREFERRED EMBODIMENT

Referring now to the drawings in detail, wherein like numerals indicate like elements throughout the several views, one sees that FIG. 1 is a plan view of a reclosable package 10 of the present invention. Reclosable package 10 includes a front polymer web panel 12 co-extensive with a rear polymer web panel 14, sealed together at side seals 16, 18 with a bottom seal 20 so as to form mouth 21. Zipper 22 makes mouth 21 reclosable. As well known to those skilled in the art, zipper 22 would have first and second interlocking zipper profiles 23, 25. As further known in the prior art, slider 24 when moved in a first direction would open the zipper 22 by causing the profiles 23, 25 to separate and when moved in a second direction would close zipper 22 by causing the profiles 23, 25 to interlock.

One of seals 16, 18 or 20 could be replaced by a fold in some embodiments. Indeed, it is envisioned that the present invention could be used with many embodiments of reclosable packages with slider zippers.

Slider 24 includes RFID chip 100 (or similar "smart" technology) which can be embedded, molded-in, or attached to the outside thereof. Additionally, in some embodiments, the RFID chip 100 can be attached to different parts of the package 10, such as zipper profiles 23, 25 or web panels 12, 14. In order to avoid the need for an internal power supply, RFID chip 100 is typically a passive RFID chip. A typical RFID chip well suited for this application is the Mu (μ)-chip by Hitachi. RFID chip 100 can be incorporated by "pick and place" components in line after the extrusion process with adhesive polymers. Likewise, RFID chip 100 can be embedded, or otherwise attached or molded or attached to slider clips with adhesive or molded into the clip during injection molding.

RFID chip 100' illustrates an alternative location for the RFID chip, wherein the RFID chip is attached to the profile or web of the reclosable package 10 in lieu of being attached to the slider 24 as illustrated in the location of RFID chip 100.

The identifying data can be downloaded into RFID chip 100 at the time the chip 100 is being manufactured, at the time when reclosable package 10 is manufactured or when the package 10 is being or has been filled.

This identifying data can be similar to a serial number which is then associated with the desired data in a database. Alternatively, the identifying data can directly include the desired data. The desired data includes manufacturing data specific to the reclosable package or the contents thereof (e.g., SKU number, part number, inventory control number, unit count, weight, pricing, manufacturer, country of origin, manufacturing date and time, manufacturing place, and any of numerous possible data regarding the contents, such as, but not limited to, the expiration date of the foodstuff contents, etc.).

The RFID chip 100 allows the identifying data of the RFID chip 100 to be associated with a specific reclosable package 10. Additionally, this association can be less precise, such as to a given lot of reclosable packages 10 (that is, a plurality of packages 10 can have RFID chips 100 with the same data).

As shown in FIG. 2, reader 200 reads identifying data from the RFID chip 100 and sends the data to computer system 300. This reading is done at a time and place remote from the original manufacturing time so that the RFID identifying data can either be used directly (with computer system 300 used to interpret the format of the data) or used to access a database as input via port 301 (or storage device) in computer system 300.

This allows specific reclosable packages 10 to be tracked thereby allowing for improved manufacturing processes (that is, a defective reclosable package can be immediately tracked to a specific manufacturing time and place), authentication (that is, the expected contents of a reclosable package can be verified), security (that is, counterfeiting of products becomes more difficult with the present invention) and inventory tracking (that is, a reader can read the RFID chips of reclosable packages at a given location and receive an inventory based on the data from the RFID chips).

Additional applications include the prevention of theft and pilferage (related to inventory control), the use of temperature sensitive materials to track acceptable storage conditions, and audio chips for advertising and promotion, instructional and tamper evident purposes. Additionally, an audio chip could include information for the product contents, such as a recipe.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A reclosable package for foodstuffs or industrial or similar items comprising:
    opposed front and rear panels of polymeric material joined together to form an interior and a mouth communicating with the interior;
    a zipper configured to open and close the mouth, the zipper including first and second interlocking profiles and a slider which, when moved in a first direction, separates the first and second interlocking profiles to open the mouth, and, when moved in a second direction, interlocks the first and second interlocking profiles to close the mouth; and
    the slider including a data storage device.

2. The reclosable package of claim 1 wherein the data storage device includes data selected from the group consisting of: manufacturing date of the reclosable package, manufacturing time of the reclosable package, filling time of the reclosable package, filling date of the reclosable package, contents of the reclosable package, expiration date of the contents of the reclosable package, SKU number of the reclosable package, SKU number of the contents of the reclosable package, part number of the contents of the reclosable package, inventory control number of the reclosable package, inventory control number of the contents of the reclosable package, unit count of the contents of the reclosable package, weight of the contents of the reclosable package, pricing of the contents of the reclosable package, manufacturer of the reclosable package, manufacturer of the contents of the reclosable package, country of origin or manufacturing place of the reclosable package and country of origin or manufacturing place of the contents of the reclosable package.

3. The reclosable package of claim 1 wherein the data storage device is attached outside of the slider.

4. The reclosable package of claim 1 wherein the data storage device is embedded in the slider.

5. The reclosable package of claim 4 wherein the data storage device is molded into the slider.

6. The reclosable package of claim 1 wherein the data storage device is free of an internal power supply.

7. A reclosable package for foodstuffs or industrial or similar items comprising:
    opposed front and rear panels of polymeric material joined together to form an interior and a mouth communicating with the interior;
    a zipper configured to open and close the mouth, the zipper including first and second interlocking profiles and a slider which, when moved in a first direction, separates the first and second interlocking profiles to open the mouth, and, when moved in a second direction, interlocks the first and second interlocking profiles to close the mouth; and
    the slider including an RFID chip storing identifying data.

8. The reclosable package of claim 7 wherein the identifying data is used to access data regarding the reclosable package or the contents thereof from a database.

9. The reclosable package of claim 7 wherein the identifying data is used as data regarding the reclosable package or the contents thereof.

10. The reclosable package of claim 9 wherein the RFID chip stores identifying data including data selected from the group consisting of: manufacturing date of the reclosable package, manufacturing time of the reclosable package, filling time of the reclosable package, filling date of the reclosable package, contents of the reclosable package, expiration date of the contents of the reclosable package, SKU number of the reclosable package, SKU number of the contents of the reclosable package, part number of the contents of the reclosable package, inventory control number of the reclosable package, inventory control number of the contents of the reclosable package, unit count of the contents of the reclosable package, weight of the contents of the reclosable package, pricing of the contents of the reclosable package, manufacturer of the reclosable package, manufacturer of the contents of the reclosable package, country of origin or manufacturing place of the reclosable package and country of origin or manufacturing place of the contents of the reclosable package.

11. The reclosable package of claim 7 wherein the RFID chip is attached outside of the slider.

12. The reclosable package of claim 7 wherein the RFID chip is embedded in the slider.

13. The reclosable package of claim 12 wherein the RFID chip is molded into the slider.

14. The reclosable package of claim 7 wherein the RFID chip is a passive RFID chip.

15. A reclosable package for foodstuffs or industrial or similar items comprising:
    opposed front and rear panels of polymeric material joined together to form an interior and a mouth communicating with the interior;
    a zipper configured to open and close the mouth, the zipper including first and second interlocking profiles and a slider which, when moved in a first direction, separates the first and second interlocking profiles to open the mouth, and, when moved in a second direction, interlocks the first and second interlocking profiles to close the mouth; and
    the slider including means for storing data.

16. The reclosable package of claim 15 wherein the means for storing data includes data selected from the group consisting of: manufacturing date of the reclosable package, manufacturing time of the reclosable package, filling time of the reclosable package, filling date of the reclosable package, contents of the reclosable package, expiration date of the contents of the reclosable package, SKU number of the reclosable package, SKU number of the contents of the reclosable package, part number of the contents of the reclosable package, inventory control number of the reclosable package, inventory control number of the contents of the reclosable package, unit count of the contents of the reclosable package, weight of the contents of the reclosable package, pricing of the contents of the reclosable package, manufacturer of the reclosable package, manufacturer of the contents of the reclosable package, country of origin or manufacturing place of the reclosable package and country of origin or manufacturing place of the contents of the reclosable package.

17. The reclosable package of claim 15 wherein the means for storing data is attached outside of the slider.

18. The reclosable package of claim 15 wherein the means for storing data is embedded in the slider.

19. The reclosable package of claim 18 wherein the means for storing data is molded into the slider.

20. The reclosable package of claim 15 wherein the means for storing data is free of an internal power supply.

* * * * *